United States Patent
Sellers, Jr. et al.

(10) Patent No.: US 11,388,153 B2
(45) Date of Patent: Jul. 12, 2022

(54) ONE-TIME PAD ENCRYPTION IN A SECURE COMMUNICATION NETWORK

(71) Applicant: The United States of America as Represented by the Secretary of the Navy, San Diego, CA (US)

(72) Inventors: William Albert Sellers, Jr., Virginia Beach, VA (US); James M Mengert, Virginia Beach, VA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 88 days.

(21) Appl. No.: 17/002,342

(22) Filed: Aug. 25, 2020

(65) Prior Publication Data

US 2022/0070149 A1 Mar. 3, 2022

(51) Int. Cl.
*H04L 9/40* (2022.01)

(52) U.S. Cl.
CPC ...... *H04L 63/0428* (2013.01); *H04L 63/0263* (2013.01); *H04L 63/20* (2013.01)

(58) Field of Classification Search
CPC .. H04L 63/0428; H04L 63/0263; H04L 63/20
USPC ........................................................ 713/168
See application file for complete search history.

(56) References Cited

U.S. PATENT DOCUMENTS

| | | | | |
|---|---|---|---|---|
| 2006/0271785 | A1* | 11/2006 | Holtmanns | H04W 12/0431 713/171 |
| 2010/0153706 | A1* | 6/2010 | Haddad | H04L 9/0662 713/153 |
| 2014/0090011 | A1* | 3/2014 | Howe | H04L 49/602 726/1 |

(Continued)

FOREIGN PATENT DOCUMENTS

CN 105721317 6/2016

OTHER PUBLICATIONS

Schneier, B. "One-Time Pads." in: Applied cryptography: protocols, algorithms, and source code in C (Wiley, 2015), p. 15-17. (Year: 2015).*

(Continued)

*Primary Examiner* — Dant B Shaifer Harriman
(74) *Attorney, Agent, or Firm* — Naval Information Warfare Center Atlantic; Kyle Eppele; James R. McGee

(57) ABSTRACT

A secure communication network includes interconnected switches including a source switch, a destination switch, and an intermediate switch. Packets are transferred over the secure communication network from a start node to an end node. The source switch replaces an original payload of each packet with an encrypted payload that combines the original payload and a respective random pad for the packet. The source switch then discards the respective random pad. The source and intermediate switches forward each packet toward the destination switch. The destination switch replaces the encrypted payload of each packet with a (Continued)

decrypted payload, which combines the encrypted payload and the respective random pad so as to match the original payload, discards the respective random pad, and transmits the packet with the decrypted payload to the end node. A controller sends the respective random pad for each packet to the source and destination switches via secure management links.

20 Claims, 4 Drawing Sheets

(56) References Cited

U.S. PATENT DOCUMENTS

| | | | | |
|---|---|---|---|---|
| 2014/0250491 | A1* | 9/2014 | Fleischman | H04L 63/06 726/1 |
| 2016/0119299 | A1 | 4/2016 | Amulothu | |
| 2016/0191421 | A1* | 6/2016 | Tsuji | H04L 45/74 370/392 |
| 2017/0093811 | A1* | 3/2017 | Dolev | H04L 45/1287 |
| 2019/0215188 | A1* | 7/2019 | Ethier | H04L 12/4641 |
| 2021/0281577 | A1* | 9/2021 | Sasaki | H04L 63/0435 |

OTHER PUBLICATIONS

Schneier, B. "One-Time Pads." in: Applied cryptography: protocols, algorithms, and source code in C (Wiley, 2015), pp. 15-17.

Network Working Group. Request for Comments: 1750, Randomness Recommendations for Security, Dec. 1994 [retrieved on Aug. 19, 2020]. Retrieved from the Internet: <URL: http://www.ietf.org/rfc/rfc1750.txt>.

Network Working Group. Request for Comments: 4086, Randomness Requirements for Security, Jun. 2005 [retrieved on Aug. 19, 2020]. Retrieved from the Internet: <URL: https://www.ietf.org/rfc/rfc4086.txt>.

Blumenthal, M. Encryption: Strengths and Weaknesses of Public-key Cryptography, 2007 [retrieved on Aug. 19, 2020]. Retrieved from the Internet: <URL: http://www.csc.villanova.edu/~mdamian/Past/csc3990fa08/csrs2007/01-pp1-7-MattBlumenthal.pdf>.

Li, C., Liao, W. Software Defined Networks. IEEE Communications Magazine, Feb. 2013.

Hogg, S. Jumbo Frames. Network World. Jun. 2013 [retrieved on Aug. 19, 2020]. Retrieved from the Internet: <URL: http://www.networkworld.com/article/2224722/cisco-subnet/jumbo-frames.html>.

* cited by examiner

ONE-TIME PAD ENCRYPTION IN A SECURE COMMUNICATION NETWORK

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111502.

BACKGROUND OF THE INVENTION

A secure communication network provides secure communication between nodes even if communications are subject to eavesdropping. Secure communication networks require balancing the overhead required to assure security and the level of security provided.

A typical current technique for securing a communication network is public key encryption. Public key encryption usually relies upon the empirical computational difficultly of factoring a large number into its prime factors. However, because computational power continually increases, public key encryption has a boundlessly increasing overhead from the continually increasing key length needed to maintain a level of security. Moreover, data protected by public key encryption that is eavesdropped on now and stored for a decade might become readily decrypted with the increase computational power then available. This is generally still is a latent security failure.

SUMMARY

A secure communication network includes interconnected switches including a source switch, a destination switch, and an intermediate switch. Packets are transferred over the secure communication network from a start node to an end node. The source switch replaces an original payload of each packet with an encrypted payload that combines the original payload and a respective random pad for the packet. The source switch then discards the respective random pad. The source and intermediate switches forward each packet toward the destination switch. The destination switch replaces the encrypted payload of each packet with a decrypted payload, which combines the encrypted payload and the respective random pad so as to match the original payload, discards the respective random pad, and transmits the packet with the decrypted payload to the end node. A controller sends the respective random pad for each packet to the source and destination switches via secure management links.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
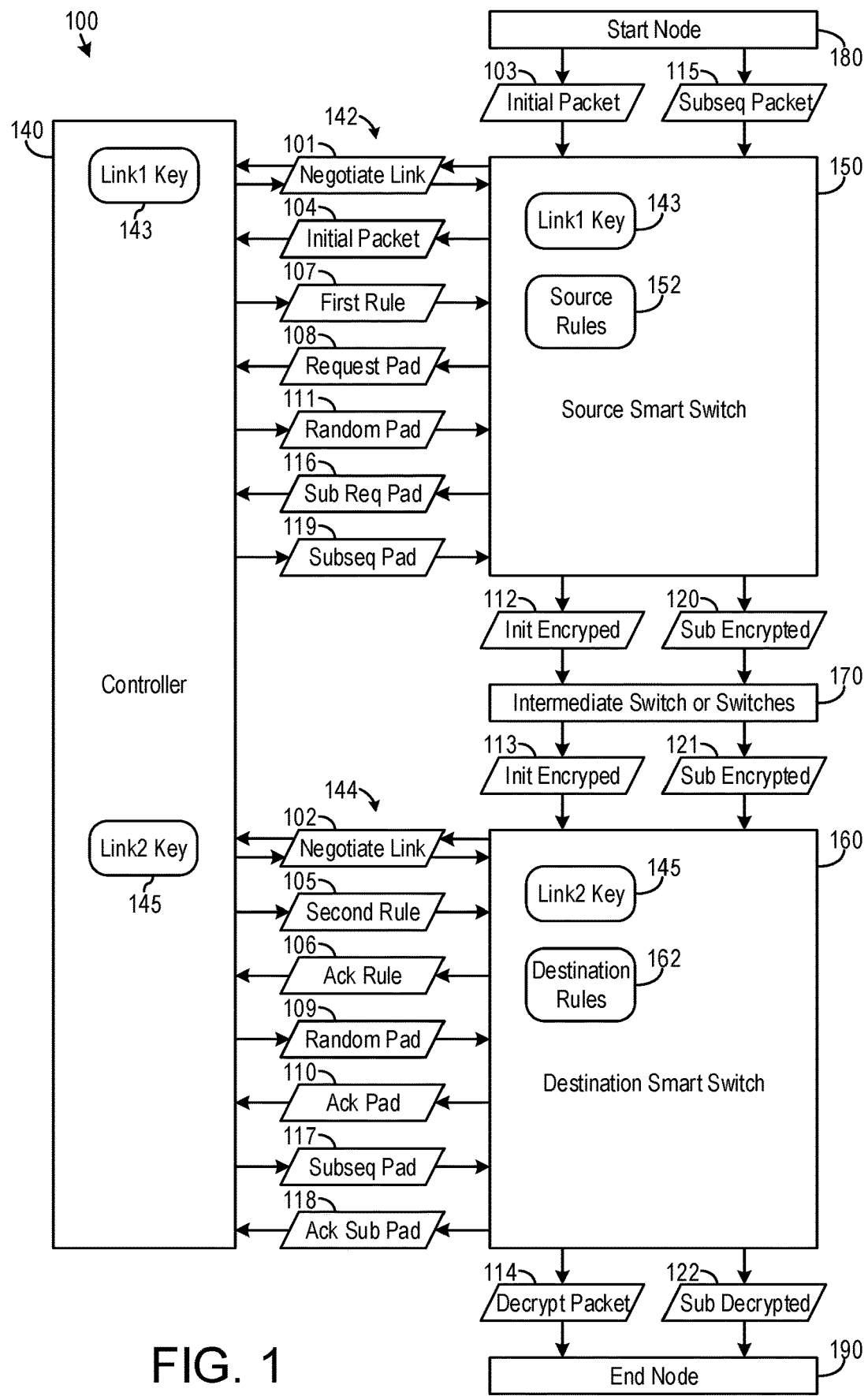
FIG. 1 is a block diagram of a secure communication network illustrating data flow for a controller that reactively configures the source switch and proactively configures the destination switch in accordance with an embodiment of the invention.

FIG. 1 is a block diagram of a secure communication network 100 illustrating data flow for a controller 140 that reactively configures the source switch 150 and proactively configures the destination switch 160 in accordance with an embodiment of the invention.

The secure communication network 100 includes interconnected switches including the source switch 150, the destination switch 160, and at least one intermediate switch 170 that are involved in transferring packets from a start node 180 to an end node 190.

The various example packets transferred among the controller 140, start node 180, source switch 150, intermediate switch 170, destination switch 160, and end node 190 are labeled with reference numbers 101 through 122 according to one possible temporal order for these packets. It will be appreciated that certain of packets 101 through 122 may be reordered, as mentioned below in some cases.

In one embodiment, the secure communication network 100 is a software-defined network, such as OpenFlow extended with software implementing functions disclosed herein. Then the source switch 150 and the destination switch 160 are smart switches, and the controller 140 is a software-defined-network controller that manages the source rules 152 of the smart source switch 150 and the destination rules 162 of the smart destination switch 160.

Typically, upon initialization of such a software-defined network, the controller 140 manages establishing a secure management link 142 between the controller 140 and the source switch 150, and manages establishing a secure management link 144 between the controller 140 and the destination switch 160. Establishing the secure management link 142 includes exchanging link negotiation packets 101 between the controller 140 and the source switch 150, including transferring a link encryption key 143 from the controller 140 to the source switch 150. Similarly, establishing the secure management link 144 includes exchanging link negotiation packets 102 that transfer another link encryption key 145 from the controller 140 to the destination switch 160. It will be appreciated that the secure management links 142 and 144 have a limited lifetime in one embodiment, such that link negotiation packets 101 and/or 102 are exchanged to reestablish an expired secure management link after the source switch receives a packet needing security protection, such as initial packet 103.

The start node 180 begins a secure information transfer over the secure communication network 100 by transmitting an initial packet 103 to the source switch 150. It will be appreciated that there may be additional intermediate switches (not shown) between the start node 180 and the source switch 150 so long as the path between the start node 180 and the source switch 150 is otherwise secured within a trust domain. These additional switches need not be smart switches. Typically, the first smart switch along the path from the start node 180 is the source switch 150 managed by the controller 140.

Upon from the start node 180 receiving the initial packet 103, the source switch 150 checks whether the source rules 152 cover the initial packet 103. If none of the source rules 152 cover the initial packet 103, the source switch 150 forwards the initial packet 104 to the controller 140 via the secure management link 142. Alternatively, the source rules 152 include a default rule specifying that for any incoming initial packet 103 not otherwise covered by the source rules 152, the source switch 150 forwards the initial packet 104 to the controller 140 via the secure management link 142.

Upon receiving the initial packet 104 not covered in the source rules 152 of the source switch 150, the controller 140 generates appropriate rules for forwarding packets from the start node 180 to an end node 190. In this embodiment, the controller 140 sends the second rule 105 to the destination switch 160 via the secure management link 144 and the controller 140 receives acknowledgement 106 that the destination switch 160 has added the second rule 105 in the destination rules 162 before the controller 140 sends the first rule 107 to the source switch 150. This ensures that when the destination switch 160 needs to use the second rule 105, the second rule 105 is already available in the destination rules 162.

Upon receiving the first rule 107 from the controller 140, the source switch 150 adds the first rule 107 to the source rules 152. Thereafter, the source switch 150 determines the initial packet 103 is covered by the first rule 107 in the source rules 152, and the first rule 107 specifies the initial packet 103 needs encryption. Therefore, the source switch 150 requests 108 a random pad from the controller 140. In one embodiment, the controller 140 generates and sends the random pad 109 to the destination switch 160 via the secure management link 144 and the controller 140 receives acknowledgement 110 that the destination switch 160 has associated the random pad 109 with the second rule 105 in the destination rules 162 before the controller 140 sends the same random pad 111 to the source switch 150. This ensures that random pad 109 is available before the destination switch 160 needs to use that random pad 109. To limit security vulnerability, the controller 140 discards the random pad after sending the random pad 109 to the destination switch 160 and sending the same random pad 111 to the source switch 150.

In summary, the source switch 150, upon receiving the initial packet 103 from start node 180, obtains from the controller 140 a first rule 107 and a random pad 111, the first rule 107 covering the initial packet 103 and specifying the initial packet 103 needs encryption using the random pad 111. Alternatively, the first rule 107 and the random pad 111 are together delivered from controller 140 to source switch 150.

The source switch 150 replaces an original payload of the initial packet 103 with an encrypted payload that combines the original payload and the random pad 111 for the initial packet 103. In one embodiment, the encrypted payload is a bit-wise exclusive-or between the original payload and part of the random pad 111 with a matching length. More generally, the encrypted payload has a length equaling the original payload of the initial packet 103 and is a reversible encryption function that combines the original payload and a part of random pad 111 with the length. To limit security vulnerability, the source switch 150 immediately discards the random pad 111, for example, the source switch 150 overwrites storage for the random pad 111 with null data.

The source switch 150 forwards the encrypted packet 112 with the encrypted payload as specified in the first rule 107 that covers the initial packet 103. The source switch 150 forwards the encrypted packet 112 toward the destination switch 160 via at least one intermediate switch 170. Each intermediate switch 170 forwards the encrypted packet 112 toward the destination switch 160 as the forwarded encrypted packet 113.

After receiving the forwarded encrypted packet 113 from the intermediate switch 170, the destination switch 160 checks whether the destination rules 162 cover the forwarded encrypted packet 113. In this embodiment, because the destination switch 160 is proactively configured with the second rule 105 added to destination rules 162 before the first rule 107 is added to the source rules 152, the already available second rule 105 covers the forwarded encrypted packet 113 and specifies the forwarded encrypted packet 113 needs decryption using the random pad 109 associated with second rule 105 in destination rules 162. Otherwise, if the destination switch 160 received the forwarded encrypted packet 113 before the second rule 105, such that there is not yet a rule in destination rules 162 covering the forwarded encrypted packet 113, the destination switch 160 would need to forward encrypted packet 113 to the controller 140 (not shown).

The destination switch 160 replaces the encrypted payload of the forwarded encrypted packet 113 with a decrypted payload that combines the encrypted payload and the random pad 109. In one embodiment, the decrypted payload is another bit-wise exclusive-or between the encrypted payload and the part of the random pad 109 used during encryption with the random pad 111 at the source switch 150. More generally, the encrypted payload has a length and the decrypted payload is a decryption function of the encrypted payload and the part of the random pad 111 having the same length, and the decryption function reverses the encryption function because the decrypted payload equals the original payload. To limit security vulnerability, the destination switch 160 discards the random pad 109, for example, the destination switch 160 overwrites the random pad 109 with null data.

The destination switch 160 transmits the decrypted packet 114 with the decrypted payload to the end node 190 as specified in the second rule 105 that covers the forwarded encrypted packet 113. The decrypted payload of decrypted packet 114 matches the original payload of initial packet 103.

An advantage of the secure communication network 100 is that the start node 180 and the end node 190 are unaware that packets transferred over the secure communication network 100 are encrypted and decrypted. Thus, no software needs to be installed on the start node 180 and the end node 190 to implement the secure communication network 100. In a typical networking environment, the various start and end nodes 180 and 190 are more complex and have more diverse types than the source and destination switches 150 and 160, such that implementation and maintenance of the secure communication network 100 is more straightforward than other techniques that require installing specialized software on the start and end nodes 180 and 190. Note each intermediate switch 170 need not be a smart switch.

Next, the start node 180 transmits a subsequent packet 115 to the source switch 150. Although the subsequent packet 115 follows the initial packet 103 in a sequence of packets from start node 180, it will be appreciated that the subsequent packet 115 might occur either before or after decrypted packet 114 reaches end node 190. The source switch 150 checks whether the source rules 152 cover the subsequent packet 115. In one embodiment for TCP/IP (Transport Control Protocol/Internet Protocol), the first rule 107 and second rule 105 cover each packet that has the same TCP/IP source address and the same TCP/IP destination address as the initial packet 103. Thus, the source rules 152 and the destination rules 162 include a covering rule for each actively communicating pairing of a TCP/IP source address and a TCP/IP destination address. Alternatively or in addition for select TCP/IP addresses, the source rules 152 and the destination rules 162 include a covering rule for each actively communicating pairing of a source port number of a TCP/IP source address and a destination port number of a TCP/IP destination address. The source and destination address are MAC addresses or physical interface addresses in other embodiments.

The subsequent packet 115 is covered by the first rule 107 that was added to the source rules 152 to cover the initial packet 103 because the initial packet 103 and the subsequent packet 115 both originate from the start node 180 and target the end node 190. From the covering first rule 107 in source rules 152, the source switch 150 determines the subsequent packet 115 needs encryption with a random pad. The source switch 150 again requests 116 a random pad from the controller 140. In response, the controller 140 sends the subsequent random pad 117 to the destination switch 160 and receives acknowledgement 118 before the controller 140 sends the same subsequent random pad 119 to the source switch 150. The controller 140 then discards the subsequent random pad.

Then, the source switch 150 forwards the subsequent encrypted packet 120 with the encrypted payload toward the destination switch 160 via at least one intermediate switch 170 as specified in the first rule 107 that covers the subsequent packet 115. The source switch 150 discards the subsequent random pad 119. The source switch 150 does not forward the subsequent packet 115 to the controller 140 because subsequent packet 115 is already covered by the first rule 107 in the source rules 152. Each intermediate switch 170 forwards the subsequent encrypted packet 120 toward the destination switch 160 as the forwarded subsequent encrypted packet 121.

The destination switch 160 determines from the covering second rule 105 in the destination rules 162 that the forwarded subsequent encrypted packet 121 needs decryption with the already available subsequent random pad 117. The destination switch 160 transmits the subsequent decrypted packet 122 with the decrypted payload to the end node 190 as specified in the second rule 105 that covers the subsequent encrypted packet 121, without forwarding the subsequent encrypted packet 121 to the controller 140. The destination switch 160 discards the subsequent random pad 117.

Figure 2:
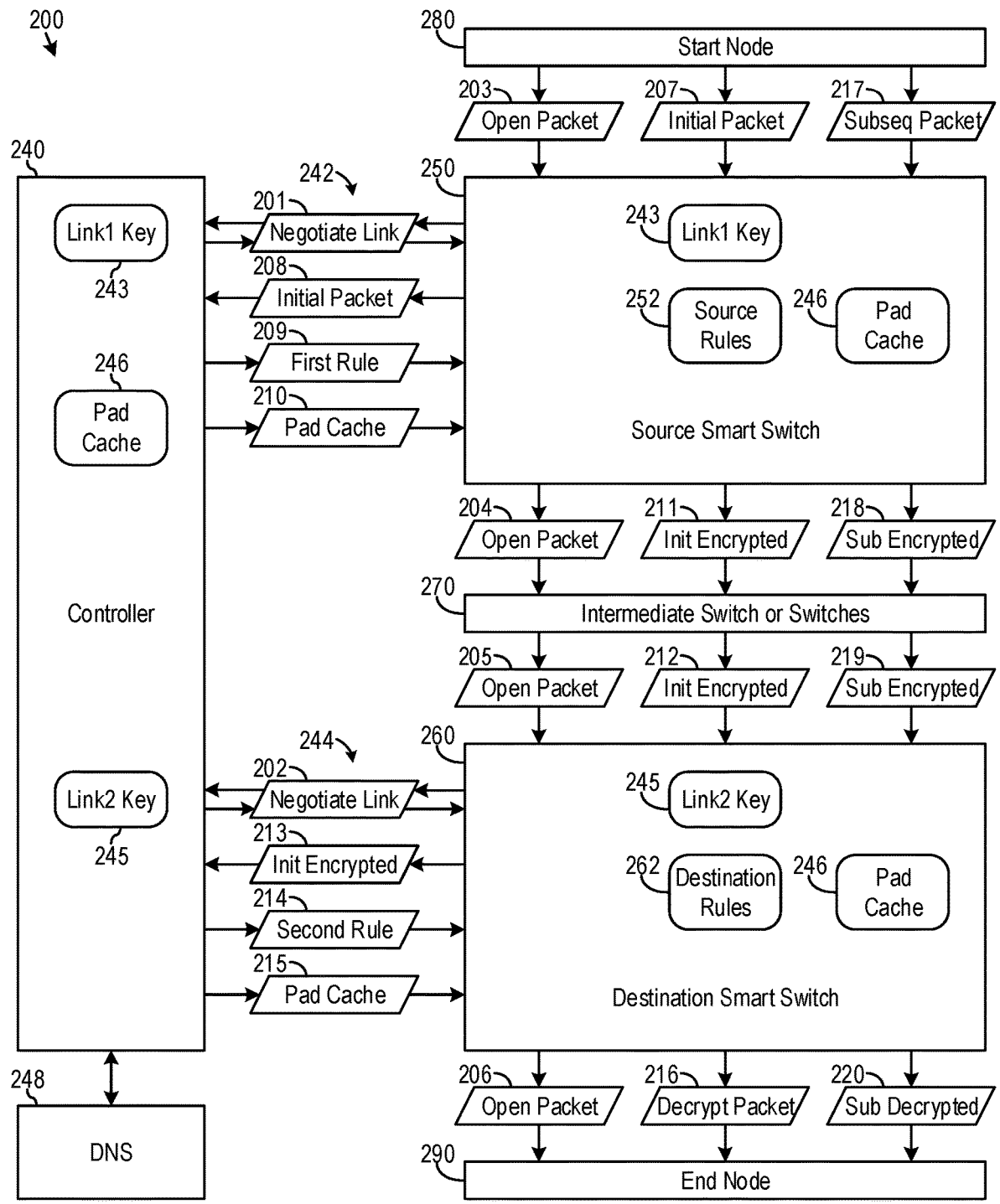
FIG. 2 is a block diagram of a secure communication network illustrating data flow for a controller that reactively configures the source and destination switches in accordance with an embodiment of the invention.

FIG. 2 is a block diagram of a secure communication network 200 illustrating data flow for a controller 240 that reactively configures the source switch 250 and the destination switch 260 in accordance with an embodiment of the invention. FIG. 2 differs from FIG. 1 in that the destination switch 260 is configured reactively instead of proactively, and a pad cache 246 is generated in advance instead of generating random pads on the fly.

In another embodiment not shown, the destination switch is configured proactively with a pad cache generated in advance, and in yet another embodiment not shown, the destination switch is configured reactively with random pads generated on the fly.

The various packets transferred among the controller 240, start node 280, source switch 250, intermediate switch 270, destination switch 260, and end node 290 are labeled with reference numbers 201 through 220 according to one possible temporal order for these packets. It will be appreciated that certain of packets 201 through 220 may be reordered.

Again, typically upon initialization of the secure communication network 200, the controller 240 manages establishing a secure management link 242 between the controller 240 and the source switch 250, and manages establishing a secure management link 244 between the controller 240 and the destination switch 260. Establishing the secure management link 242 includes exchanging link negotiation packets 201 that transfer a link encryption key 243 from the controller 240 to the source switch 250. Similarly, establishing the secure management link 244 includes exchanging link negotiation packets 202 that transfer another link encryption key 245 from the controller 240 to the destination switch 260.

In addition to packets needing protection with encryption, the secure communication network 200 transfers open packets not needing encryption, such as open packet 203 transferring an unsecured payload from the start node 280 to the end node 290. It will be appreciated that secure communication network 100 of FIG. 1 similarly transfers open packets (not shown). In one embodiment, the controller 240 cooperates with a domain name server (DNS) 248 to initialize high-level rules specifying that TCP/IP destination addresses resolving into the ".com" and ".org" top-level domains, for example, are never encrypted and these high-level rules are initialized in the source rules 252 of the source switch 250 and the destination rules 262 of the destination switch 260. In contrast, for TCP/IP destination addresses resolving into the ".mil" top-level domain, for example, the controller 240 generates appropriate rules for forwarding certain types of packets with encryption and forwarding other types of packets without encryption, with these rules added to the source rules 252 and the destination rules 262 as they are needed.

The source switch 250 checks whether the source rules 252 cover the open packet 203. Because a covering rule in the source rules 252 specifies the open packet 203 does not need encryption, the source switch 250 forwards the open packet 203 unmodified as the unsecured open packet 204 forwarded toward the destination switch 260 via at least one intermediate switch 270. Because the open packet 203 is covered in the source rules 252, the source switch 250 does not forward the open packet 203 to the controller 240.

Each intermediate switch 270 forwards the unsecured open packet 204 toward the destination switch 260 as the forwarded unsecured open packet 205. The destination switch 260 transmits the unsecured open packet 205 as the unsecured open packet 206 with the original payload of the open packet 203. The destination switch 260 transmits forwarded unsecured open packet 206 to the end node 290 as specified in a covering rule in the destination rules 262. The destination switch 260 does not forward the unsecured open packet 205 to the controller 240.

The start node 280 begins a secure information transfer over the secure communication network 200 by transmitting an initial packet 207 to the source switch 250. Upon from the start node 280 receiving the initial packet 207, the source switch 250 checks whether the source rules 252 cover the initial packet 207. If none of the source rules 252 cover the initial packet 207, the source switch 250 forwards the initial packet 208 to the controller 240 via the secure management link 242.

Upon receiving the initial packet 208 not covered in the source rules 252 of the source switch 250, the controller 240 generates an appropriate rule for forwarding packets from the start node 280 to an end node 290. The controller 240 sends the first rule 209 to the source switch 250 via the secure management link 242. The controller 240 initializes a cache 246 of random pads associated with the first rule 209 and transmits 210 the pad cache 246 to the source switch 250 via the secure management link 242.

Upon receiving the first rule 209 from the controller 240, the source switch 250 adds the first rule 209 to the source rules 252. Thereafter, the source switch 250 determines the initial packet 207 is covered by the first rule 209 in the source rules 252, and the first rule 209 specifies the initial packet 207 needs encryption using the associated cache 246 of random pads. The source switch 250 forwards the initial packet 207 as the forwarded initial packet 211 with the encrypted payload that combines the original payload of the initial packet 207 as and the respective random pad from the pad cache 246. The source switch 250 discards the respective random pad from the pad cache 246, for example, overwriting the respective random pad with null data.

In one embodiment, each entry in the pad cache 246 has length equaling the maximum possible length of a payload in a TCP/IP packet, and each entry in the pad cache 246 stores a respective random pad. The number of entries in the pad cache 246 equals the number of possible sequence numbers for TCP/IP packets. The length of each entry times the number of entries specifies a predetermined size of the cache. Thus, deep inspection of the initial packet 207 extracts the sequence number provided by the start node 280 in the header of the initial packet 207, and this sequence number is reused as an indicator of the entry in the pad cache 246 for the respective random pad at both the source switch 250 and the destination switch 260. Because there generally are multiple paths having different queuing delays through intermediate switches 270, packets generally arrive out-of-order at the destination switch 260, but the reused sequence number unambiguously identifies the proper respective random pad in the pad cache 246. When sequence numbers roll over, the source switch 250 requests another cache of random pads from the controller 240 (not shown). In another embodiment, an indicator identifying an entry in the cache for the respective random pad is included in a header of another layer of encapsulation added by the source switch 250 and removed by the destination switch 260.

The source switch 250 forwards the encrypted packet 211 with the encrypted payload as specified in the first rule 209 that covers the initial packet 207. The source switch 250 forwards the encrypted packet 211 toward the destination switch 260 via at least one intermediate switch 270. Each intermediate switch 270 forwards the encrypted packet 211 toward the destination switch 260 as the forwarded encrypted packet 212.

After receiving the forwarded encrypted packet 212 from at least one intermediate switch 270, the destination switch 260 checks whether the destination rules 262 cover the forwarded encrypted packet 212. Because in this embodiment the destination rules 262 are not proactively configured to cover the forwarded encrypted packet 212, the forwarded encrypted packet 212 is not covered by the destination rules 262 and so the destination switch 260 forwards the encrypted packet 213 to the controller 240.

Upon receiving the encrypted packet 213 from destination switch 260, the controller 240 generates and sends a second rule 214 and transmits 215 the associated cache 246 of random pads to the destination switch 260 via the secure management link 244. To limit security vulnerability, the controller 240 then discards the entire pad cache 246.

The destination switch 260 adds the second rule 214 to the destination rules 262. Because the second rule 214 rule covers the forwarded encrypted packet 212 and specifies the forwarded encrypted packet 212 needs to be decrypted with the respective random pad from pad cache 246, the destination switch 260 transmits the decrypted packet 216 with the decrypted payload to the end node 290. In one embodiment, the destination switch 260 obtains the respective random pad from an entry in the pad cache 246 identified by an indicator in the header of the forwarded encrypted packet 212. The decrypted payload combines the encrypted payload from the forwarded encrypted packet 212 and the respective random pad from the pad cache 246. After decryption, the destination switch 260 discards the respective random pad from the pad cache 246. The decrypted payload of the decrypted packet 216 transmitted to the end node 290 matches the original payload of the initial packet 207.

Next, the start node 280 transmits a subsequent packet 217 to the source switch 250. The source switch 250 checks whether the source rules 252 cover the subsequent packet 217. Because the subsequent packet 217 from start node 280 targets the same end node 290, the first rule 209 of the source rules 252 covers the subsequent packet 217. From the covering first rule 209 in source rules 252, the source switch 250 determines the subsequent packet 217 needs encryption with the respective random pad from pad cache 246. If pad cache 246 is exhausted, the source switch 250 requests a replacement pad cache from the controller 240 (not shown) and associates this replacement pad cache with the first rule 209.

The source switch 250 forwards the subsequent encrypted packet 218 with the encrypted payload toward the destination switch 260 via at least one intermediate switch 270 as specified in the first rule 209 that covers the subsequent packet 217. The source switch 250 discards the respective random pad from the pad cache 246 within the source switch 250. The source switch 250 does not forward the subsequent packet 217 to the controller 240 because subsequent packet 217 is already covered by the first rule 209 in the source rules 252. Each intermediate switch 270 forwards the subsequent encrypted packet 218 toward the destination switch 260 as the forwarded subsequent encrypted packet 219. The destination switch 260 transmits the subsequent decrypted packet 220 with the decrypted payload to the end node 290 as specified in the second rule 214 that covers the subsequent encrypted packet 219, without forwarding the subsequent encrypted packet 219 to the controller 240. The destination switch 260 discards the respective random pad from the pad cache 246 within the destination switch 260.

Figure 3:
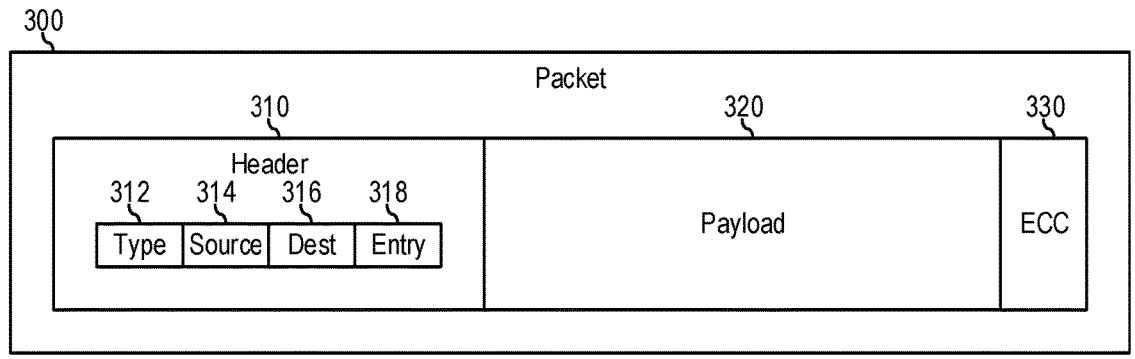
FIG. 3 is a diagram of certain fields of a packet in accordance with one or more embodiments of the invention.

FIG. 3 is a diagram of certain fields of a packet 300 in accordance with one or more embodiments of the invention. The packet 300 includes a header 310 containing a type field 312, a source address 314 identifying a start node, a destination address 316 identifying an end node, and an entry field 318. The packet 300 also includes a data payload 320 and a forward error-correcting code 330 for detecting and correcting bit errors occurring during transmission of the packet 300 over a secure communication network.

The source switch uses the type field 312, the source address 314, and the destination address 316 to determine whether any rule covers packet 300 in the source rules of the source switch.

If a rule exists in the source rules covering the packet 300 and the rule specifies the packet 300 is an open packet not needing encryption, the source switch forwards the packet 300 towards the destination switch unmodified. If a rule exists in the source rules covering the packet 300 and the rule specifies the packet 300 needs encryption, the source switch replaces the payload 320 with an encrypted payload that combines the original payload with the respective random pad for the packet 300. The source switch obtains the respective random pad for the packet 300 from the controller on-the-fly in one embodiment. In another embodiment, entry field 318 identifies an entry in a pad cache obtained from the controller, and the source and destination switches obtain the respective random pad for the packet 300 from the identified entry in the pad cache.

In one embodiment with a pad cache having a predetermine size of the maximum possible length of payload 320 times the number of possible sequence numbers for TCP/IP packets, the entry field 318 is the sequence number field of the TCP/IP packets.

If no rule exists in the source rules covering the packet 300, the source switch obtains a covering rule from the controller. The source switch drops the packet 300 when the controller does not timely provide a covering rule or the controller indicates no such rule is appropriate for packet 300. The destination switch similarly operates in accordance with any covering rule for packet 300 in the destination rules of the destination switch.

In one embodiment, when the source switch replaces the payload 320 with an encrypted payload, the source switch regenerates the forward error-correcting code 330 to enable detection and correction of bit errors during transmission of the encrypted packet 300 through the secure communication network. When the destination switch replaces the payload 320 with an unencrypted payload, the destination switch checks and corrects any bit errors and then regenerates the forward error-correcting code 330 before transmitting packet 300 to the end node. In another embodiment, the forward error-correcting code 330 is not modified within the secure communication network, especially when the encryption and decryption are a bit-wise exclusive-or with the random pad because then any bit errors in the encrypted payload are reflected in the same bits of the decrypted payload without any spreading to other bits, and therefore the decrypted payload can be checked and corrected within the capabilities of the original forward error-correcting code 330.

Figure 4:
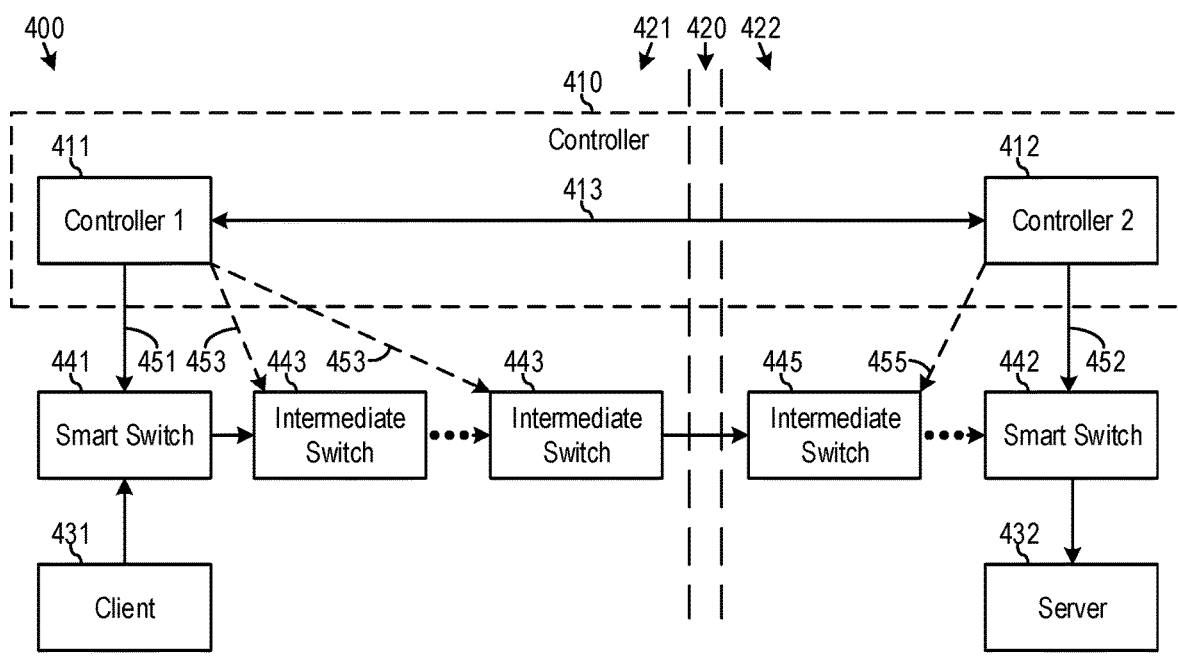
FIG. 4 is a diagram of a secure communication network that has a distributed controller including a controller in each trust domain in accordance with an embodiment of the invention.

FIG. 4 is a diagram of a secure communication network 400 that has a distributed controller 410 including a controller 411 in a first trust domain 421 and a controller 412 in a second trust domain 422 in accordance with an embodiment of the invention.

The controller 411 and client's smart switch 441 are in the first trust domain 421 securing the secure management link 451. The first trust domain 421 optionally includes one or more switches 443, which are not necessarily smart switches, especially when the switches 443 do not connect to client or server nodes as shown. If switches 443 are smart switches managed by distributed controller 410, then first trust domain 421 includes additional secure management links 453 between the controller 411 and the switches 443. Similarly, the second trust domain 422 optionally includes a switch 445 and an additional secure management link 455 when switch 445 is a smart switch managed by distributed controller 410. It will be appreciated that the controller 411 and the client's smart switch 441 can be integrated together with an internal secure management link 451, and similarly the controller 412 and server's smart switch 442 can be integrated together.

The domain 420 outside the first and second trust domains 421 and 422 is generally the public internet, such as networking infrastructure provided by public telecommunication companies. For example, the first trust domain 421 is a secured facility on the west coast and the second trust domain 422 is a secured facility on the east coast that are connected via public networking infrastructure. Even when the domain 420 is public networking infrastructure subject to eavesdropping, the secure communication network 400 maintains secure communications between client node 431 and the server node 432.

To distribute rules and random pads to switches 441 and 442 in different trust domains 421 and 422, distributed controller 410 transfers data between controller 411 and controller 412 via a secure management link 413 that passes through domain 420 outside the first and second trust domains 421 and 422. In one embodiment, secure management link 413 includes a virtual private network (VPN) through a public domain 420. Security of the secure communication network 400 is assured so long as distributed controller 410 randomly generates the random pads of the appropriate lengths, securely transfers the random pads to the client's smart switch 441 and the server's smart switch 442, and ensures that all participants discard the random pads after use. Randomly generating the random pads does not include typical pseudo-random number generation because such pseudo-random number generation is highly predictable. Ideally, a random physical process, such as radioactive decay, generates the random pads. Securely transferring random pads includes physical transport of stored random pads, such as generating random pads at a secure west-coast facility and storing the random pads on a storage disk and a duplicate storage disk, and shipping the duplicate storage disk to a secure east-coast facility.

The secure communication network 400 enables secure communication between various nodes including the client node 431 and server node 432. For example, a user of the client node 431 requests a web page in an internet browser with the web page provided by server node 432. This user request generates a get request packet transferred over the secure communication network 400 from the client node 431 to the server node 432, with the payload of the get request packet specifying the requested information, such as a Uniform Resource Locator (URL). For this get request packet, the client node 431 is the start node 180 or 280 of FIGS. 1 and 2, and the server node 432 is the end node 190 or 290 of FIGS. 1 and 2. In response to the get request packet, the server node 432 sends one or more reply packets transferred over the secure communication network 400 from the server node 432 to the client node 431, with the return payload of each reply packet including part of the requested information. For each reply packet, the server node 432 is the start node 180 or 280 of FIGS. 1 and 2, and the client node 431 is the end node 190 or 290 of FIGS. 1 and 2.

Thus, the secure communication network 400 is symmetric. The process shown in FIG. 1 or FIG. 2 occurs not only for the get request packet from client node 431 to the server node 432, but also for each reply packet from the server node 432 to the client node 431.

In particular for an initial reply packet, when a covering rule does not yet exist in the rules of the server's smart switch 442, the server's smart switch 442 forwards the initial reply packet to the controller 410 via the secure management link 452. The controller 410 generates a reply rule for forwarding from the server node 432 to the client node 431, and sends the reply rule to the server's smart switch 442 via the secure management link 452. The server's smart switch 442 adds the reply rule to its rules and thereafter replaces the return payload of the initial reply packet with an encrypted return payload that combines the return payload and a random pad received from the controller 410. Then, the server's smart switch 442 discards the random pad, and forwards the initial reply packet with the encrypted return payload toward the client's smart switch 441 as specified in the reply rule that covers the initial reply packet.

Figure 5:
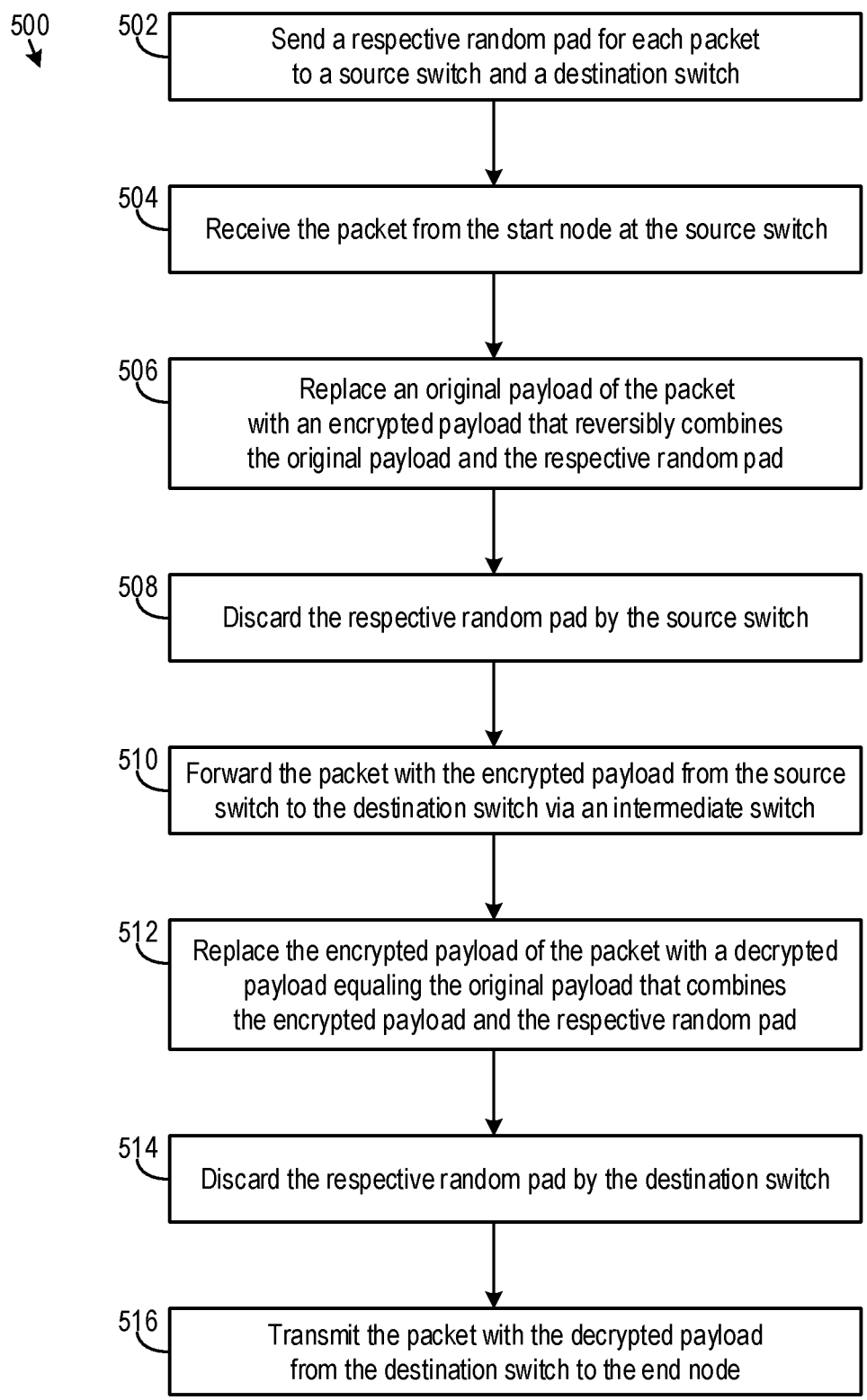
FIG. 5 is a flow diagram of a process for securing each packet transferred over a secure communication network from a start node to an end node.

FIG. 5 is a flow diagram of a process 500 for securing each packet transferred over a secure communication network from a start node to an end node.

At step 502, a respective random pad for the packet is sent to a source switch and a destination switch. Step 502 occurs either before or after step 504.

At step 504, the packet is received from the start node at the source switch. At step 506, the source switch replaces an original payload of the packet with an encrypted payload that reversibly combines the original payload and the respective random pad for the packet. At step 508, the source switch discards the respective random pad. At step 510, the packet with the encrypted payload is forwarded from the source switch to the destination switch via at least one intermediate switch.

At step 512, the destination switch replaces the encrypted payload of the packet with a decrypted payload that combines the encrypted payload and the respective random pad for the packet. The decrypted payload equals the original payload. At step 514, the destination switch discards the respective random pad. At step 516, the destination switch transmits the packet with the decrypted payload to the end node.

Although various embodiments of the invention require generating and transferring random pads having a length and hence overhead matching the length of the data secured, these embodiments still have important advantages over other security techniques such as public key encryption. A typical public key encryption relies upon the empirical computational difficultly of factoring a large number into its prime factors; however, as computational power increases the length and hence overhead for the large number must boundlessly increase to maintain a comparable computation difficulty. Such public key encryption is also vulnerable to mathematical or non-deterministic computational discoveries that might dramatically reduce the computational difficultly of factoring a large number into its prime factors. Thus, data protected by public key encryption that is stored now might be readily decrypted in a decade. Unlike other security techniques, various embodiments of the invention require an amount of overhead and provide a level of security that do not vary over time.

Again, in various embodiments of the invention, security of the secure communication network 400 is assured so long as the random pads are of sufficient length, randomly generated, securely transferred, and discarded after use.

From the above description of the One-Time Pad Encryption in a Secure Communication Network, it is manifest that various techniques may be used for implementing the concepts of secure communication networks 100, 200, and 400 and method 500 without departing from the scope of the claims. The described embodiments are to be considered in all respects as illustrative and not restrictive. The apparatus and method disclosed herein may be practiced in the absence of any element that is not specifically claimed and/or disclosed herein. It should also be understood that the secure communication network is not limited to the particular embodiments described herein, but is capable of many embodiments without departing from the scope of the claims.

We claim:

1. A secure communication network comprising:
a plurality of interconnected switches including a source switch, a destination switch, and at least one intermediate switch for at least one packet transferred over the secure communication network from a start node to an end node, wherein:
the source switch is adapted, upon from the start node receiving each packet of the at least one packet, to replace an original payload of the packet with an encrypted payload that combines the original payload and a respective random pad for the packet, to discard the respective random pad, and to forward the packet with the encrypted payload toward the destination switch via the at least one intermediate switch,
each of the at least one intermediate switch is adapted to forward each packet of the at least one packet toward the destination switch, and
the destination switch is adapted, upon from the at least one intermediate switch receiving each packet of the at least one packet, to replace the encrypted payload of the packet with a decrypted payload that combines the encrypted payload and the respective random pad, to discard the respective random pad, and to transmit the packet with the decrypted payload to the end node, with the decrypted payload matching the original payload; and
at least one controller adapted to send the respective random pad for each packet of the at least one packet to the source and destination switches via secure management links, which include a first secure management link between the controller and the source switch and a second secure management link between the controller and the destination switch,
wherein the source switch is a first smart switch managed through a plurality of source rules and the destination switch is a second smart switch adapted through a plurality of destination rules, and the controller is a software-defined-network controller that manages the secure management links and manages the source rules of the source switch and the destination rules of the destination switch.

2. The secure communication network of claim 1, wherein a length of the respective random pad for each packet of the at least one packet equals or exceeds a length of the original payload of the packet.

3. The secure communication network of claim 1, wherein:
the encrypted payload, which combines the original payload and the respective random pad, is a bit-wise exclusive-or between the original payload and at least part of the respective random pad; and
the decrypted payload, which combines the encrypted payload and the respective random pad, is another bit-wise exclusive-or between the encrypted payload and the at least part of the respective random pad, such that the decrypted payload equals the original payload.

4. The secure communication network of claim 1, wherein:
the encrypted payload, which combines the original payload and the respective random pad, has a length equaling the original payload and is a first function of the original payload and a part of the respective random pad having the length; and
the decrypted payload, which combines the encrypted payload and the respective random pad, has the length and is a second function of the encrypted payload and the part of the respective random pad, wherein the first function is reversible with the second function because the decrypted payload equals the original payload.

5. The secure communication network of claim 1, wherein:
the source switch is the first smart switch managed through the source rules, wherein upon from the start node receiving an initial packet of the at least one packet and upon the source rules not covering the initial packet, the source switch is adapted to forward the initial packet to the controller via the first secure management link;
the controller is adapted, upon from the source switch receiving the initial packet not covered in the source rules of the source switch, to generate a first and second rule for forwarding from the start node to the end node, and to send the first rule to the source switch via the first secure management link and the second rule to the destination switch via the second secure management link;
the source switch is adapted, upon from the controller receiving the first rule, to add the first rule to the source rules and thereafter, for each packet of the at least one packet including the initial packet after receiving the packet from the start node, to forward the packet with the encrypted payload toward the destination switch via the at least one intermediate switch as specified in the first rule that covers the packet; and
the destination switch is the second smart switch adapted through the destination rules, wherein the destination switch is adapted, upon from the controller receiving the second rule, to add the second rule to the destination rules and thereafter, for each packet of the at least one packet including the initial packet after receiving the packet from the at least one intermediate switch, to transmit the packet with the decrypted payload to the end node as specified in the second rule that covers the packet.

6. The secure communication network of claim 5, wherein the at least one packet is a sequence of a plurality of packets including the initial packet and a subsequent packet, which follows the initial packet in the sequence, and wherein:
the source switch is adapted, upon receiving the subsequent packet from the start node, to forward the subsequent packet with the encrypted payload toward the destination switch via the at least one intermediate switch as specified in the first rule that covers the subsequent packet, without forwarding the subsequent packet to the controller.

7. The secure communication network of claim 5, wherein:
the controller is adapted, upon from the source switch receiving the initial packet not covered in the source rules of the source switch, to generate a cache of a plurality of random pads including the respective pad for each of the at least one packet up to a predetermined size of the cache, and to send the cache to the source switch via the first secure management link and the destination switch via the second secure management link;
the source switch is adapted, for each packet of the at least one packet including the initial packet after receiving the packet from the start node, to forward the packet with the encrypted payload that combines the original payload and the respective random pad from the cache; and
the destination switch is adapted, for each packet of the at least one packet including the initial packet after receiving the packet from the at least one intermediate switch, to transmit the packet with the decrypted payload that combines the encrypted payload and the respective random pad from the cache.

8. The secure communication network of claim 7, wherein:
the source switch is adapted, for each packet of the at least one packet including the initial packet after receiving the packet from the start node, to forward the packet with the encrypted payload and with an indicator in a header of the packet identifying an entry in the cache for the respective random pad for the packet; and
the destination switch is adapted, for each packet of the at least one packet including the initial packet after receiving the packet from the at least one intermediate switch, to transmit the packet with the decrypted payload that combines the encrypted payload and the respective random pad from the entry in the cache identified by the indicator in the header of the packet.

9. The secure communication network of claim 1, wherein the at least one packet is a plurality of packets, and for each packet of the packets:
the source switch is adapted, upon receiving the packet from the start node, to send to the controller a first request requesting the respective random pad for the packet via the first secure management link; and
the controller is adapted, upon receiving the first request, to generate and send the respective random pad for the packet to the source switch via the first secure management link;
the destination switch is adapted, upon receiving the packet from the at least one intermediate switch, to send to the controller a second request requesting the respective random pad for the packet via the second secure management link; and
the controller is adapted, upon receiving the second request, to send the respective random pad for the packet to the destination switch via the second secure management link.

10. The secure communication network of claim 1, wherein:
the source switch is the first smart switch managed through the source rules, wherein upon from the start node receiving an initial packet of the at least one packet and upon the source rules not covering the initial packet, the source switch is adapted to forward the initial packet to the controller via the first secure management link;
the controller is adapted, upon from the source switch receiving the initial packet not covered in the source rules of the source switch, to generate a first rule for forwarding from the start node to the end node, and to send the first rule to the source switch via the first secure management link;

the source switch is adapted, upon from the controller receiving the first rule, to add the first rule to the source rules and thereafter, for each packet of the at least one packet including the initial packet after receiving the packet from the start node, to forward the packet with the encrypted payload toward the destination switch via the at least one intermediate switch as specified in the first rule that covers the packet;

the destination switch is the second smart switch managed through the destination rules, wherein upon from the at least one intermediate switch receiving the initial packet and upon the destination rules not covering the initial packet, the destination switch is adapted to forward the initial packet to the controller via the second secure management link;

the controller is adapted, upon from the destination switch receiving the initial packet not covered in the destination rules of the destination switch, to generate a second rule for forwarding from the start node to the end node, and to send the second rule to the destination switch via the second secure management link; and the destination switch is adapted, upon from the controller receiving the second rule, to add the second rule to the destination rules and thereafter, for each packet of the at least one packet including the initial packet after receiving the packet from the at least one intermediate switch, to transmit the packet with the decrypted payload to the end node as specified in the second rule that covers the packet.

11. The secure communication network of claim 10, wherein the at least one packet is a sequence of a plurality of packets including the initial packet and a subsequent packet, which follows the initial packet in the sequence, and wherein:

the source switch is adapted, upon receiving the subsequent packet from the start node, to forward the subsequent packet with the encrypted payload toward the destination switch via the at least one intermediate switch as specified in the first rule that covers the subsequent packet, without forwarding the subsequent packet to the controller; and the destination switch is adapted, upon receiving the subsequent packet from the at least one intermediate switch, to transmit the subsequent packet with the decrypted payload to the end node as specified in the second rule that covers the subsequent packet, without forwarding the subsequent packet to the controller.

12. The secure communication network of claim 10, wherein:

the controller is adapted, upon from the source switch receiving the initial packet not covered in the source rules of the source switch, to generate a cache of a plurality of random pads including the respective pad for each of the at least one packet up to a predetermined size of the cache, and to send the cache to the source switch via the first secure management link;

the source switch is adapted, for each packet of the at least one packet including the initial packet after receiving the packet from the start node, to forward the packet with the encrypted payload that combines the original payload and the respective random pad from the cache;

the controller is adapted, upon from the destination switch receiving the initial packet not covered in the destination rules of the destination switch, to send the cache to the destination switch via the second secure management link; and the destination switch is adapted, for each packet of the at least one packet including the initial packet after receiving the packet from the at least one intermediate switch, to transmit the packet with the decrypted payload that combines the encrypted payload and the respective random pad from the cache.

13. The secure communication network of claim 12, wherein:

the source switch is adapted, for each packet of the at least one packet including the initial packet after receiving the packet from the start node, to forward the packet with the encrypted payload and with an indicator in a header of the packet identifying an entry in the cache for the respective random pad for the packet; and the destination switch is adapted, for each packet of the at least one packet including the initial packet after receiving the packet from the at least one intermediate switch, to transmit the packet with the decrypted payload that combines the encrypted payload and the respective random pad from the entry in the cache identified by the indicator in the header of the packet.

14. The secure communication network of claim 1, wherein a plurality of packets transferred over the secure communication network from the start node to the end node includes the at least one packet and an unsecured packet, wherein:

the source switch is adapted to forward the unsecured packet unmodified toward the destination switch via the at least one intermediate switch without forwarding the unsecured packet to the controller even if the unsecured packet is an initial packet of the plurality of packets at the source switch; and the destination switch is adapted to transmit the unsecured packet unmodified to the end node without forwarding the unsecured packet to the controller even if the unsecured packet is an initial packet of the plurality of packets at the destination switch.

15. The secure communication network of claim 1 that is symmetric, wherein the at least one packet transferred over the secure communication network from a start node to an end node is a request packet with the original payload of the request packet specifying information the start node requests from the end node, and in response the end node sends at least one reply packet transferred over the secure communication network from the end node to the start node, the at least one reply packet including an initial reply packet with a return payload including at least part of the information requested, wherein:

the destination switch is the second smart switch managed through the destination rules, wherein upon receiving the initial reply packet from the end node and upon the destination rules not covering the initial reply packet, the destination switch is adapted to forward the initial reply packet to the controller via the second secure management link;

the controller is adapted, upon from the destination switch receiving the initial reply packet not covered in the destination rules of the destination switch, to generate a reply rule for forwarding from the end node to the start node, and to send the reply rule to the destination switch via the second secure management link; and the destination switch is adapted, upon receiving the reply rule from the controller, to add the reply rule to the destination rules and thereafter to replace the return payload of the initial reply packet with an encrypted return payload that combines the return payload and a random pad received from the controller, to discard the random pad, and to forward the initial reply packet with the encrypted return payload toward the source switch as specified in the reply rule that covers the initial reply packet.

16. The secure communication network of claim 1, wherein upon initialization of the secure communication network:
the controller and the source switch are adapted to negotiate establishing the first secure management link, including transferring an encryption key for the first secure management link; and
the controller and the destination switch are adapted to negotiate establishing the second secure management link, including transferring an encryption key for the second secure management link.

17. A secure communication network comprising:
a plurality of interconnected switches including a source switch, a destination switch, and at least one intermediate switch for at least one packet transferred over the secure communication network from a start node to an end node, wherein:
the source switch is adapted, upon from the start node receiving each packet of the at least one packet, to replace an original payload of the packet with an encrypted payload that combines the original payload and a respective random pad for the packet, to discard the respective random pad, and to forward the packet with the encrypted payload toward the destination switch via the at least one intermediate switch,
each of the at least one intermediate switch is adapted to forward each packet of the at least one packet toward the destination switch, and
the destination switch is adapted, upon from the at least one intermediate switch receiving each packet of the at least one packet, to replace the encrypted payload of the packet with a decrypted payload that combines the encrypted payload and the respective random pad, to discard the respective random pad, and to transmit the packet with the decrypted payload to the end node, with the decrypted payload matching the original payload; and
at least one controller adapted to send the respective random pad for each packet of the at least one packet to the source and destination switches via secure management links, which include a first secure management link between the controller and the source switch and a second secure management link between the controller and the destination switch,
wherein the at least one packet is a plurality of packets, and for each packet of the packets:
the source switch is adapted, upon receiving the packet from the start node, to send to the controller a request requesting the respective random pad for the packet via the first secure management link; and
the controller is adapted, upon receiving the request, to generate and send the respective random pad for the packet to the source and destination switches via the secure management links.

18. A secure communication network comprising:
a plurality of interconnected switches including a source switch, a destination switch, and at least one intermediate switch for at least one packet transferred over the secure communication network from a start node to an end node, wherein:
the source switch is adapted, upon from the start node receiving each packet of the at least one packet, to replace an original payload of the packet with an encrypted payload that combines the original payload and a respective random pad for the packet, to discard the respective random pad, and to forward the packet with the encrypted payload toward the destination switch via the at least one intermediate switch,
each of the at least one intermediate switch is adapted to forward each packet of the at least one packet toward the destination switch, and
the destination switch is adapted, upon from the at least one intermediate switch receiving each packet of the at least one packet, to replace the encrypted payload of the packet with a decrypted payload that combines the encrypted payload and the respective random pad, to discard the respective random pad, and to transmit the packet with the decrypted payload to the end node, with the decrypted payload matching the original payload; and
at least one controller adapted to send the respective random pad for each packet of the at least one packet to the source and destination switches via secure management links, which include a first secure management link between the controller and the source switch and a second secure management link between the controller and the destination switch,
wherein the at least one controller is a plurality of controllers including a first and second controller, the first controller and the source switch in a first trust domain securing the first secure management link, and the second controller and the destination switch in a second trust domain securing the second secure management link, and wherein the first controller is adapted to send the respective random pad for each packet of the at least one packet to the second controller via another secure management link between the first and second controllers that passes outside the first and second trust domains.

19. The secure communication network of claim 17, wherein for each packet of the packets:
the source switch is adapted, upon receiving the packet from the start node, to send to the controller the request, which is a first request requesting the respective random pad for the packet via the first secure management link; and
the controller is adapted, upon receiving the first request, to generate and send the respective random pad for the packet to the source switch via the first secure management link;
the destination switch is adapted, upon receiving the packet from the at least one intermediate switch, to send to the controller a second request requesting the respective random pad for the packet via the second secure management link; and
the controller is adapted, upon receiving the second request, to send the respective random pad for the packet to the destination switch via the second secure management link.

20. A method of securing each packet of a plurality of packets transferred over a secure communication network from a start node to an end node, the method comprising:

receiving the packet from the start node at a source switch;

sending to a controller a first request in response to the receiving, the first request requesting a respective random pad for the packet via a first secure management link;

sending the respective random pad for the packet from the controller to the source switch via the first secure management link;

replacing, by the source switch, an original payload of the packet with an encrypted payload that reversibly combines the original payload and the respective random pad for the packet;

discarding the respective random pad by the source switch;

forwarding the packet with the encrypted payload from the source switch to a destination switch via at least one intermediate switch;

sending to a controller a second request in response to the forwarding, the second request requesting the respective random pad for the packet via a second secure management link;

sending the respective random pad for the packet from the controller to the destination switch via the second secure management link;

replacing, by the destination switch, the encrypted payload of the packet with a decrypted payload that combines the encrypted payload and the respective random pad for the packet, wherein the decrypted payload equals the original payload;

discarding the respective random pad by the destination switch; and transmitting the packet with the decrypted payload from the destination switch to the end node.

\* \* \* \* \*